(12) United States Patent
Koch et al.

(10) Patent No.: US 12,485,511 B2
(45) Date of Patent: Dec. 2, 2025

(54) METHOD, SYSTEM AND COMPUTER PROGRAM PRODUCT FOR DETERMINING A MACHINING PATH AND METHOD FOR MACHINING A WORKPIECE USING OF A MULTI-AXIS MACHINE TOOL

(71) Applicant: OPEN MIND Technologies AG, Wessling (DE)

(72) Inventors: Josef Koch, Munich (DE); Peter Brambs, Munich (DE)

(73) Assignee: OPEN MIND Technologies AG, Wessling (DE)

( * ) Notice: Subject to any disclaimer, the term of this patent is extended or adjusted under 35 U.S.C. 154(b) by 673 days.

(21) Appl. No.: 17/890,229

(22) Filed: Aug. 17, 2022

(65) Prior Publication Data
US 2023/0056743 A1 Feb. 23, 2023

(30) Foreign Application Priority Data
Aug. 18, 2021 (DE) ...................... 10 2021 121 398.3

(51) Int. Cl.
*B23Q 15/12* (2006.01)
(52) U.S. Cl.
CPC .................................... *B23Q 15/12* (2013.01)
(58) Field of Classification Search
CPC ........... G05B 2219/39082; G05B 2219/50112; G05B 2219/50109; G05B 2219/49147;
(Continued)

(56) References Cited

U.S. PATENT DOCUMENTS 11,213,945 B2 * 1/2022 Kuwahara ............... G06F 30/20
2020/0324413 A1 * 10/2020 Lin ........................ G05B 19/19
(Continued)

FOREIGN PATENT DOCUMENTS

DE 19856099 A1 7/2000
DE 102013112232 B3 3/2015
(Continued)

OTHER PUBLICATIONS

Extended Search Report issued by the European Patent Office for European Patent Application No. 22188416.6-1205, dated Jan. 4, 2023.
(Continued)

*Primary Examiner* — Nicholas Klicos
(74) *Attorney, Agent, or Firm* — Bradley Arant Boult Cummings LLP; Henry B. Ward, III

(57) ABSTRACT

A method and software is provided for machining a workpiece, including for determining a machining path for material-removing machining of a workpiece using a multi-axis machine tool, wherein control commands for controlling a number of N different machine axes of a machine tool can be generated from the machining path with computer support, according to which a tool can be moved continuously along the machining path, wherein the machining path comprises a first engagement path segment and a second engagement path segment along which the tool engages with the workpiece at least in sections, and wherein the machining path further comprises a connecting path segment along which the tool does not engage with the workpiece and which connects an end point of the first engagement path segment to a starting point of the second engagement path segment continuously and collision-free with the workpiece.

19 Claims, 5 Drawing Sheets

(58) Field of Classification Search
CPC .......... G05B 2219/37575; G05B 2219/35316; G05B 2219/35349; G05B 19/4061; G05B 19/19; G05B 19/402; G05B 19/4097; G05B 19/4207

See application file for complete search history.

(56) References Cited

U.S. PATENT DOCUMENTS

2021/0325844 A1* 10/2021 Yu ................... G05B 19/4069
2021/0356938 A1* 11/2021 Schneider ........... G05B 19/416

FOREIGN PATENT DOCUMENTS

EP      3623887 A1    3/2020
WO   2017005453 A2    1/2017

OTHER PUBLICATIONS

Search Report issued by the German Patent Office for German Patent Application No. 10 2021 121 398.3, dated May 10, 2022.
Kiani, Kourosh; Sharifi, Mostafa; Shakeri, Majid, "Optimization of cutting trajectory to improve manufacturing time in computer numerical control machine using ant colony algorithm." Proceedings of the Institution of Mechanical Engineers, Part B: Journal of Engineering Manufacture, 2014, vol. 228, Nr. 7, S. 811-816.
Tian, Yang; Jiang, Pingyu, "Optimization of tool motion trajectories for pocket milling using a chaos ant colony algorithm," In: 2007 10th IEEE International Conference on Computer-Aided Design and Computer Graphics. IEEE, 2007. S. 389-394.

* cited by examiner

METHOD, SYSTEM AND COMPUTER PROGRAM PRODUCT FOR DETERMINING A MACHINING PATH AND METHOD FOR MACHINING A WORKPIECE USING OF A MULTI-AXIS MACHINE TOOL

CROSS-REFERENCE TO RELATED APPLICATIONS

The present disclosure claims priority of German Patent Application No. 10 2021 121 398.3, filed to German Patent Office on Aug. 18, 2021. Contents of the present disclosure are hereby incorporated by reference in entirety of the German Patent Application.

BACKGROUND

The invention relates to a method, system and computer program product for determining a machining path for material-removing machining of a workpiece using a multi-axis machine tool. The invention further relates to a method for machining a workpiece using a multi-axis machine tool.

Multi-axis machine tools or machining systems that may be used to machine a workpiece are known from the prior art. A common class of such machine tools are 5-axis machines which frequently have three linear axes and two rotary axes for moving the tool relative to a workpiece. However, depending on the application, machines with a larger or smaller number of axes are used.

When machining a workpiece, the tool used is guided along a machining path. The machining path is calculated by a computer relative to the workpiece. Computer-aided manufacturing (CAM) systems are used for this purpose, which may generate a machining path from computer-aided drawing (CAD) data, i.e. a three-dimensional model of the object to be manufactured, using different strategies for path calculation. The machining path is usually composed of several path segments. Such path segments may be engagement path segments along which the tool engages with the workpiece at least in sections. An engagement path segment may comprise approach and departure movements. There may also be path segments that are connecting path segments along which the tool does not engage with the workpiece. A connecting path segment usually connects two engagement path segments with each other.

Once a machining path has been created, it is used to generate machine code for the machine tool. This machine code defines the movement of the various components of the machine tool. This may be, for example, rotating and/or pivoting of a workpiece table, a, in particular linear, movement of a tool spindle, rotating and/or pivoting of the tool spindle and/or a, in particular linear, movement of the workpiece table, whereby the tool spindle and workpiece table may also be rotated, pivoted and/or moved simultaneously. The distribution of the different machine axes to different components of the machine depends on the type of machine tool and may be arbitrary.

The tool paths of two successive engagement path segments may be connected to each other in a CAM system in different ways. From DE 10 2013 112 232 B3 it is known to use linear segments or curved segments as connecting path segments. If necessary, collisions with obstacles that are located between the engagement path segments to be connected are avoided by, for example, moving the corresponding connection path segment further up or otherwise adapting its shape.

In the case of curved connecting path segments, both the tool position—relative to the tool tip—and the orientation of the tool axis are continuously interpolated at the same time. The curved connecting path segment may be calculated as a spline, for example, to create a smooth course of the machining path.

However, a smooth course of connecting path segments is evident from a perspective starting from the workpiece. The connecting path segments are described in a reference system in which the position and orientation of the workpiece are unchanged. In the real-life machine, however, the tool table and the machining spindle or other components of the machine tool move relative to each other during machining. Accordingly, a connecting path segment that is comparatively simple relative to the workpiece may require a complex superposition of several movements of different components of the machine tool relative to several or all of the machine axes, in which the machine axes also perform movements back and forth that may sometimes be jerky. This leads to considerable losses in the efficiency of workpiece machining in the real-life machine as well as to a high load on the machine.

BRIEF SUMMARY OF THE INVENTION

Starting from the prior art, the present invention is based on the task of achieving a high degree of efficiency and/or a low degree of load for a machine with respect to the design of connecting path segments.

According to the invention, this task is solved by a method for determining a machining path for material-removing machining of a workpiece using a multi-axis machine tool, wherein control commands for controlling a number of N different machine axes of a machine tool can be generated from the machining path, according to which a milling tool, can be moved continuously along the machining path, wherein the machining path comprises a first engagement path segment and a second engagement path segment along which the tool engages with the workpiece at least in sections, and wherein the machining path further comprises a connecting path segment along which the tool does not engage with the workpiece and which connects an end point of the first engagement path segment to a starting point of the second engagement path segment continuously and collision-free with the workpiece; the method comprising defining an interpolation group of machine axes comprising at least one and no more than N−1 of the N machine axes; determining, for the machine axes of the interpolation group, a respective interpolation starting point defined by the end point of the first engagement path segment relative to the respective machine axis; determining, for the machine axes of the interpolation group, a respective interpolation end point defined by the starting point of the second engagement path segment relative to the respective machine axis; determining, for the machine axes of the interpolation group, a respective link function between the respective interpolation starting point and the respective interpolation end point by interpolation with respect to the respective machine axis; defining the connecting path segment in accordance with the determined link functions; and defining the machining path using the determined connecting path segment.

In one embodiment of the method, the interpolating is performed such that the link function for each of the machine axes of the interpolation group is an at least substantially monotonic function. In another embodiment of the method, for at least one of the machine axes which does not belong to the interpolation group, collision-avoiding non-monotonic interpolation is carried out between the end point of the first engagement path segment and the starting point of the second engagement path segment. In another embodiment, the method further comprises determining one of the N machine axes not belonging to the interpolation group as the retraction machine axis; determining, for the retraction machine axis, a retraction starting point defined by the end point of the first engagement path segment relative to the retraction axis; determining, for the retraction machine axis, a retraction end point defined by the starting point of the second engagement path segment relative to the retraction machine axis; and determining, for the retraction machine axis, a retraction function that extends between the retraction starting point and the retraction end point taking into account a geometry of the workpiece such that, when moving along the connecting path, the tool is first moved back with respect to the retraction machine axis and subsequently moved forward again in a way that, in combination with the one or more link functions determined for the interpolation group, a collision with the workpiece is avoided. In another embodiment of the method, the retraction function is determined from the group consisting of a continuous, tangent-continuous and curvature-continuous function with a single extremum. In another embodiment of the method, the retraction axis is a linear axis. In another embodiment of the method, the retraction axis is a rotary axis. In another embodiment of the method, the retraction axis is a machine axis of the machine tool selected from the group consisting of a machine axis having a highest acceleration capability and a highest maximum speed. In another embodiment of the method, determining the retraction machine axis is based on a user specification. In another embodiment of the method, determining the interpolation group is based on a user specification. In another embodiment of the method, the link function is an at least substantially monotonic function in that, for a reference function which is a monotonic function connecting the respective interpolation starting point to the respective interpolation end point and for which a maximum deviation from the link function is minimal, the maximum deviation between the link function and the reference function is smaller than 20% of a distance between the interpolation starting point and the interpolation end point with respect to the respective machine axis. In another embodiment of the method, the maximum deviation between the link function and the reference function is smaller than 10% of a distance between the interpolation starting point and the interpolation end point with respect to the respective machine axis. In another embodiment of the method, the maximum deviation between the link function and the reference function is smaller than 5% of a distance between the interpolation starting point and the interpolation end point with respect to the respective machine axis. In another embodiment of the method, the connecting path segment is determined iteratively by performing a collision check for different iterations based on a respective other interpolation group in each case. In another embodiment of the method, the respective link function is determined at least in sections by linear interpolation. In another embodiment of the method, the respective link function is selected from the group consisting of stepped and S-bend-shaped. In another embodiment of the method, the interpolation group comprises exactly N−1 of the N machine axes. In another embodiment of the method, N is at least 5. In another embodiment of the method, the machining path selected from the group consisting of (i) in the connecting path segment and (ii) at transitions between the connecting path segment and at least one of the engagement path segments, is selected from the group consisting of tangent-discontinuous and curvature-discontinuous.

In another embodiment, a method is provided for machining a workpiece using a multi-axis machine tool which comprises different machine axes and which is adapted to machine a workpiece using a milling tool, by moving the tool along a machining path, wherein the machining path comprises a first engagement path segment and a second engagement path segment along which the tool engages with the workpiece at least in sections, and wherein the machining path further comprises a connecting path segment along which the tool does not engage with the workpiece and which connects an end point of the first engagement path segment to a starting point of the second engagement path segment continuously and collision-free with the workpiece; the method comprising machining the workpiece by moving the tool along the first engagement path segment; moving the tool along the connecting path segment by generating movements in the machine axes, wherein the movements in the machine axes are generated such that a backward movement and a subsequent forward movement of the tool take place in one of the machine axes and a movement is generated in each of the other machine axes, the direction of movement of which is maintained or reversed temporarily to an at most insignificant extent when moving along the connecting path segment; and machining the workpiece by moving the tool along the second engagement path segment. In one embodiment, the machine tool has at least five machine axes and wherein a movement is generated in at least four machine axes whose movement is maintained or reversed to an at most insignificant extent when moving along the connecting path segment. In another embodiment, the machining path selected from the group consisting of (i) in the connecting path segment and (ii) at transitions between the connecting path segment and at least one of the engagement path segments, is selected from the group consisting of tangent-discontinuous and curvature-discontinuous.

A computer program product is provided for determining a machining path for a material-removing machining of a workpiece using a multi-axis machining machine, wherein control commands for controlling a number of N different machine axes of a machining machine can be generated from the machining path, according to which a milling tool, can be moved continuously along the machining path, wherein the machining path comprises a first engagement path segment and a second engagement path segment along which the tool engages with the workpiece at least in sections, and wherein the machining path further comprises a connecting path segment which connects an end point of the first engagement path segment to a starting point of the second engagement path segment continuously and collision-free with the workpiece; wherein the computer program product comprising at least one non-transitory computer readable medium having computer-readable program code portions embodied therein, the computer-readable program code portions comprising executable portions for defining an interpolation group of machine axes comprising at least one and no more than N−1 of the N machine axes; determining, for the machine axes of the interpolation group, a respective interpolation starting point defined by the end point of the first engagement path segment with respect to the respective machine axis; determining, for the machine axes of the interpolation group, a respective interpolation end point defined by the starting point of the second engagement path segment relative to the respective machine axis; determining, for the machine axes of the interpolation group, a respective link function between the respective interpolation starting point and the respective interpolation end point by interpolation with respect to the respective machine axis; defining the connecting path segment in accordance with the determined link functions; and defining the machining path using the determined connecting path segment.

A system is provided for machining a workpiece comprising a multi-axis machine tool which comprises different machine axes and which is adapted to machine a workpiece using a milling tool, by moving the tool along a machining path, wherein the machining path comprises a first engagement path segment and a second engagement path segment along which the tool engages with the workpiece at least in sections, and wherein the machining path further comprises a connecting path segment along which the tool does not engage with the workpiece and which connects an end point of the first engagement path segment to a starting point of the second engagement path segment continuously and collision-free with the workpiece; a memory device having at least one non-transitory computer readable medium with computer-readable program code stored thereon; and a processing device operatively coupled to the memory device, wherein the processing device is configured to execute the computer-readable program code to: define an interpolation group of machine axes comprising at least one and no more than N−1 of the N machine axes; determine, for the machine axes of the interpolation group, a respective interpolation starting point defined by the end point of the first engagement path segment with respect to the respective machine axis; determine, for the machine axes of the interpolation group, a respective interpolation end point defined by the starting point of the second engagement path segment relative to the respective machine axis; determine, for the machine axes of the interpolation group, a respective link function between the respective interpolation starting point and the respective interpolation end point by interpolation with respect to the respective machine axis; define the connecting path segment in accordance with the determined link functions; and define the machining path using the determined connecting path segment.

The present invention is based on the realization that surprisingly beneficial effects for the machining performance and efficiency during machining in the machine tool are easy to achieve if, when determining machining paths, it is already taken into account what generating them means for the machine axes of the machine tool. The present invention is further based on the realization that an improved method for creating machining paths may be defined by improving a movement profile of the machine axes.

The invention provides a method for determining a machining path for material-removing machining of a workpiece using a multi-axis machine tool, in particular independently of the specific machine control and/or as a specification for post-processing or as a post-processable machining path. In this case, control commands for controlling a number of N different machine axes of a machine tool can be and/or are generated from the machining path with computer support, for example in the context of post-processing, according to which a tool, in particular a milling tool, can be moved continuously along the machining path.

A machining path may comprise a first engagement path segment and a second engagement path segment along which the tool engages with the workpiece at least in sections. The machining path may further comprise a connecting path segment along which the tool does not engage with the workpiece and which connects an end point of the first engagement path segment to a starting point of the second engagement path segment continuously and collision-free with the workpiece.

The method according to the invention comprises defining an interpolation group of machine axes comprising at least one and no more than N−1 of the N machine axes; determining, in particular automatically, for the machine axes of the interpolation group, a respective interpolation starting point defined by the end point of the first engagement path segment with respect to the respective machine axis; determining, in particular automatically, for the machine axes of the interpolation group, a respective interpolation end point defined by the starting point of the second engagement path segment with respect to the respective machine axis; determining, in particular automatically, for the machine axes of the interpolation group, a respective link function between the respective interpolation starting point and the respective interpolation end point by interpolation with respect to the respective machine axis; defining, in particular automatically, the machining path segment in accordance with the determined link functions; and defining, in particular automatically, the machining path using the determined connecting path segment.

The invention further comprises one or more computer-executable program code portions or instruction code. The one or more computer-executable program code portions or instruction code may implement the method according to the invention in whole or in part. In particular, it comprises program code adapted to perform said steps of defining an interpolation group of machine axes, determining respective interpolation starting points and interpolation end points, determining a respective link function, defining a connecting path segment, and defining a machining path.

According to the invention, calculations may be performed in the respective machine axis. In this way, a movement of the real-life machine is taken into account when determining the machining path. Connecting paths may be generated that prevent unnecessary axis movements, thus saving time and protecting the machine. In addition, collision avoidance may be achieved in a way that is both very efficiently and protects the machine. The invention further allows to reduce and/or avoid reversal movements with respect to some or most of the machine axes. On the one hand, this may reduce the time required to move along a connecting path segment because only a smaller amount of acceleration and deceleration is required. Furthermore, it may spare the corresponding drives of the machine, which have to provide acceleration and/or deceleration less frequently and/or to a lesser extent.

The invention further relates to a method for machining a workpiece using a multi-axis machine tool which comprises different machine axes and which is adapted to machine a workpiece using a tool, in particular using a cutting tool such as a milling tool, a drilling tool, etc., by moving the tool along a machining path. The machining path may be a machining path determined in the method for determining a machining path according to the invention. The method for machining a workpiece may comprise a method for determining a machining path.

The machining path may comprise a first engagement path segment and a second engagement path segment along which the tool engages with the workpiece at least in sections. The machining path may further comprise a connecting path segment along which the tool does not engage with the workpiece and which connects an end point of the first engagement path segment to a starting point of the second engagement path segment continuously and collision-free with the workpiece. The method may include machining the workpiece by moving the tool along the first engagement path segment. In addition, the method may comprise moving the tool along the connecting path segment by generating movements in the machine axes, wherein the movements in the machine axes are generated such that in at least one and in some embodiments in exactly one of the machine axes a backward movement and a subsequent forward movement of the tool are performed, and that in each of the other machine axes a movement is generated whose direction of movement is maintained or reversed temporarily to an at most insignificant extent when moving along the connecting path segment. The method may further comprise machining the workpiece by moving the tool along the second engagement path segment.

Defining the machining path using the determined connecting path segment may comprise defining the machining path by lining up, in particular directly, the first engagement path segment, the connecting path segment, and the second engagement path segment.

In some embodiments, N may be 5. However, another number of machine axes may be used, such as 3, 4 or 6. In other words, the machine tool may have at least five machine axes, wherein in each of at least four machine axes a movement is generated whose direction of movement is maintained or reversed to an at most insignificant extent when moving along the connecting path segment.

The axes for which interpolation is performed in relation to the respective machine axis are selected by defining the interpolation group. The interpolation group may be defined automatically or on the basis of a user specification. In other words, a starting point and an end point for interpolation are selected in the interpolation group for each of the machine axes included, and subsequently a link function is determined by interpolation.

The machining path may be generated in particular using one or more computer-executable program code portions or instruction code and/or a computer and/or other programmable data processing apparatus that can be used independently of the machine tool. For example, a computer-aided manufacturing (CAM) system may be used. The method may include the creation of numerical control (NC) code as control commands for controlling the machine axes, in particular in the framework of post-processing. NC code may be generated on the basis of the defined machining path and/or independently of the above-mentioned method steps.

It is understood that any cutting machine tools and any corresponding tools fall within the scope of the invention. The machining may be cutting machining. The machining may comprise milling, drilling, grinding, etc., as well as correspondingly suitable tools.

The machining path is in particular a path along which a defined point of the tool and/or a tool contour of the tool is moved. This may be, for example, a center point, a contact point, a specific point on a tool cutting edge and/or a specific point on a tool axis.

Along an engagement path segment, the tool may machine the workpiece at least in sections when engaged. The engagement path may additionally include approach and departure movements. In other words, a particular engagement path segment defines a particular (partial) machining operation, such as machining a surface, drilling a recess, etc. A connecting path segment, however, represents a segment of the machining path that causes a transfer of the tool between two (partial) machining operations. This may be, for example, a movement from one side of the workpiece to another side of the workpiece, a movement from one drilled hole to another drilled hole, a movement from a first pocket machined to a second pocket machined, or the like.

The determined link functions may each establish a link between the relevant interpolation starting point and interpolation end point with respect to the relevant machine axis. At least one or all of the link functions may be continuous and/or curvature-continuous and/or tangent-continuous. At least one or all of the link functions may be continuous but tangent-discontinuous and/or curvature-discontinuous following a movement in the respective machine axis before the respective interpolation starting point and/or after the respective interpolation end point. In other embodiments, at least one or all of the link functions may follow a movement in the respective machine axis before the respective starting point and/or after the respective end point in a continuous and/or tangent-discontinuous and/or curvature-discontinuous manner.

Determining the respective interpolation starting point and/or the respective interpolation end point may comprise the machine reading of the coordinate of the associated end point and/or starting point of the adjacent engagement path segments with respect to the relevant machine axis. The respective interpolation is performed in particular via a process step axis or via a series of program lines. Accordingly, the link functions may describe a relationship between the coordinate with respect to the relevant machine axis and that of the process progress and/or program line.

The interpolation group may comprise at least one and in particular all existing rotary axes. In addition to the at least one rotary axis, the interpolation group may comprise at least one linear axis or a number M of linear axes, where M may be equal to N minus the number of rotary axes included. In some embodiments of the invention, the at least one machine axis not included in the interpolation group is a linear axis. All machine axes not included in the interpolation group may be linear axes. For such constellations, collision avoidance is particularly easy to implement. However, other combinations may also be provided. For example, the at least one machine axis that is not included in the interpolation group may also be a rotary axis. This may be beneficial to certain machining operations and/or workpiece geometries if, for example, a collision can be effectively avoided by suitable twisting or pivoting.

In other embodiments, the interpolation group may include at least one and in particular all linear axes available. In this case, in addition to the at least one linear axis, the interpolation group may include at least one rotary axis or a number M of rotary axes, where M may be equal to N minus the number of linear axes included. In some embodiments of the invention, the at least one machine axis not included in the interpolation group is a rotary axis. All machine axes not included in the interpolation group may be rotary axes.

The connecting path segment is collision-free in particular in that the tool is guided systematically around the workpiece along the connecting path segment. In particular, the connecting path segment has a curved path. The connecting path segment may, for example, follow a path that differs from a straight path. Also, in some embodiments, the connecting path segment may differ from a circular path or circular path segment. The connecting path segment may be configured to be curved in at least two spatial directions. In this regard, the connecting path segment may be collision-free to the extent that a collision would occur in the absence of its curvature.

The interpolation group may comprise exactly N−1 of the N machine axes. This may have the advantage that very pronounced reversal movements have to be executed in only one machine axis.

Said reversing of the direction of movement to at most an insignificant extent may comprise movement along the relevant axis during the reversal over a distance equaling no more than 20%, in some embodiments no more than 10%, and in particular no more than 5% of a distance over which reversal occurs to produce the retraction and subsequent forward movement. In other words, the direction of movement may be substantially maintained.

According to one embodiment, interpolation is performed such that the link function for each of the machine axes of the interpolation group is an at least substantially monotonic function. This may include a monotonic function as well as a function slightly different from a monotonic function. In contrast to a monotonic function, the relevant function may possibly comprise reversal points, but reversal movements described in the relevant machine axis are small compared to the overall movement defined by the function. For example, this may include reversal movements in the single-digit percentage range compared to a total range of movement. The use of at least essentially monotonic functions means that the drives assigned to the relevant machine axes only have to generate minor forward and reverse movements, which may help to avoid unnecessarily high acceleration and deceleration.

The link function may be an at least substantially monotonic function in that, for a reference function which is a monotonic function connecting the respective interpolation starting point to the respective interpolation end point and for which a maximum deviation from the link function is minimal, the maximum deviation between the link function and the reference function is less than 20%, preferably less than 10% and particularly preferably less than 5% of a distance between the interpolation starting point and the interpolation end point relative to the respective machine axis. In other words, whether or not a link function is essentially monotonic may be determined by comparing the relevant interpolation function with all possible monotonic functions, selecting the monotonic function for which the maximum distance to the interpolation function is the smallest, determining such maximum distance and then comparing it with the specified limit values.

Collision avoidance may be achieved efficiently and in a way that protects the machine especially if, for at least one of the machine axes that does not belong to the interpolation group, collision-avoiding non-monotonic interpolation, preferably neither monotonic nor essentially monotonic interpolation, is performed between the end point of the first engagement path segment and the starting point of the second engagement path segment. In other words, collision avoidance is achieved with those machine axes that do not belong to the interpolation group. In some embodiments, a monotonic or at least substantially monotonic link function is determined with respect to all but one of the machine axes, and a non-monotonic link function is determined with respect to the remaining machine axis.

According to one embodiment, the method may further comprise determining of at least one, in particular exactly one, of the N machine axes, which does not belong to the interpolation group, as a retraction machine axis. In this way, collision avoidance may be realized in a simple and targeted manner. The retraction machine axis may be an axis in which the tool is retracted or moved away from the workpiece to prevent a collision. The retraction machine axis may be a linear axis. This may, for example, allow the tool to be effectively retracted and/or moved away from the workpiece, which works reliably regardless of the workpiece geometry. The retraction axis may also be a rotary axis. In the case of workpieces with appropriate geometry, a collision may be avoided very efficiently, if necessary, by rotating or pivoting the workpiece relative to the tool. The method may include the use of different retraction axes for different connecting path segments.

The determination of the retraction machine axis may be based on a user specification. A user may also specify a group of possible axes from which at least one is automatically selected as the retraction machine axis. Such automated selection may be global, related to a program section or individual for each connecting path segment. Alternatively or additionally, a user specification may be applicable and/or retrievable globally, in relation to a program section or individually for each connecting path segment. In some embodiments, one retracting machine axis or even several possible retracting machine axes may be specified as default but may be modifiable by user specification. For example, a particular linear axis may be specified as the retraction axis by default while a user-specified selection of a different axis for some or all of the connecting path segments may be possible. Furthermore, it may be provided that a user may specify which machine axis or machine axes should in no case serve as retraction axis.

A high degree of time efficiency and/or a machining program that protects the machine may be achieved in particular if the retraction axis is a machine axis and/or one of the linear axes and/or one of the rotary axes of the machine tool that has the highest acceleration capability and/or the highest maximum speed among the machine axes.

The method may further comprise determining, for the retraction machine axis, a retraction starting point defined by the end point of the first engagement path segment relative to the retraction axis. The method may further comprise determining, for the retraction machine axis, a retraction end point defined by the starting point of the second engagement path segment with respect to the retraction machine axis. In other words, the retraction starting point and the retraction end point may correspond to those coordinates with respect to the retraction machine axis between which collision-avoiding retraction is to occur. The method may further comprise the step of determining, for the retraction machine axis, a retraction function that extends between the retraction starting point and the retraction end point, taking into account a geometry of the workpiece, such that the tool is first moved back with respect to the retraction machine axis and then moved forward again when moving along the connecting path such that, in combination with the one or more link functions determined for the interpolation group, collision with the workpiece is avoided. In some embodiments, the retraction function is determined as a continuous, preferably tangent-continuous, and particularly preferably curvature-continuous function with a single extremum. For example, a parabolic, arcuate, and/or bell-shaped function may be used. This may lead to a gentle and thus machine-protecting movement in the corresponding machine axis.

A high degree of variability may be achieved and/or process-related characteristics may effectively be taken into account in particular if the determination of the interpolation group is based on a user specification. For example, a user may specify which machine axes must belong to the interpolation group and/or which machine axes may belong to the interpolation group if necessary and/or which machine axes should in no case belong to the interpolation group. In some embodiments, one interpolation group or several optionally selectable interpolation groups may be predefined as a preselection or default, which may also allow the user to make changes. Preferably, each machine is either included in the interpolation group or serves as a retraction axis.

According to the invention, iterative determination of the connecting path segment may be provided. The iterative determination may comprise performing a collision check each for different iterations based on each different interpolation group. This allows to efficiently determine how to avoid a collision in manner that is reliable and time-efficient and protects the machine. Preferably, a single machine axis is selected as the retraction axis for each iteration, and the collision check is performed for the remaining machine axes in the interpolation group for the relevant iteration.

Connecting path segments may in particular be determined with high computational efficiency and/or such that a tool can be reliably moved along them if the respective link function is determined at least in sections by linear interpolation. The link function may comprise several linearly interpolated sections. The respective link function may alternatively or additionally be stepped and/or S-bend-shaped and/or have rounded steps.

Optimization of connecting path segments with regard to reliable collision avoidance is especially easy to achieve if the machining path in the connecting path segment and/or at transitions between the connecting path segment and at least one of the engagement path segments is tangent-discontinuous and/or curvature-discontinuous. In other words, the engagement path segments and the connecting path segment lying between them do not necessarily have to merge smoothly and/or without a curved kink, or the connecting path segment does not have to be configured smoothly and/or without a kink in the curve. For example, linear sub-sections with different gradients may be adjacent to one another.

The invention further comprises a computer program product having at least one storage medium on which the program code of the software according to the invention is stored. The storage medium may be a volatile and/or a non-volatile storage medium.

In the following, the present invention is described by way of example with reference to the accompanying figures. The drawing, the specification and the claims contain combinations of numerous features. The skilled person will appropriately consider the features also individually and use them in useful combinations within the scope of the claims. In the drawings:

DETAILED DESCRIPTION OF EMBODIMENTS OF THE INVENTION

Figure 1:
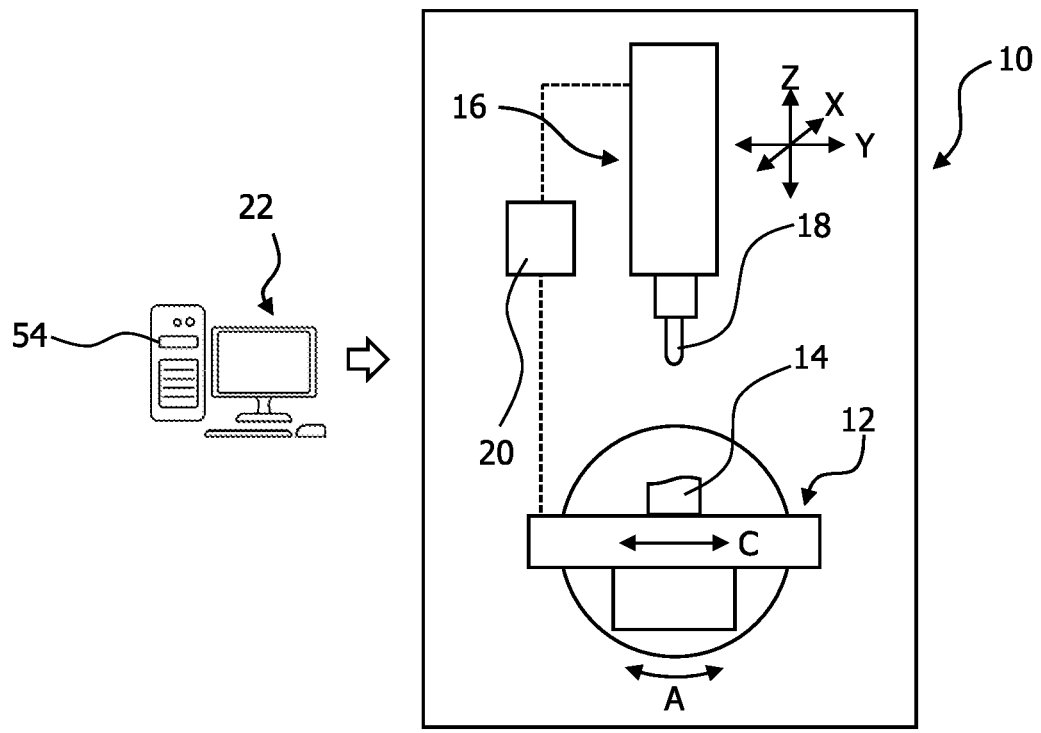
FIG. 1 is a schematic representation of a machine tool.

For the following specification, reference is made to the machine tool 10 schematically shown in FIG. 1. It is to be understood purely by way of example, in particular with regard to its movable axes. In other embodiments, other machine axes and/or a different number of machine axes may be provided.

The machine tool 10 comprises a workpiece table 12 on which a workpiece 14 can be arranged and/or fastened. The workpiece 14 may be machined using the machine tool 10. In the exemplary case, this is a milling machine.

The machine tool 10 further comprises a machining unit 16, such as a head or milling head, having a tool 18 for machining the workpiece 14. In the case illustrated, the machining unit 16 comprises, for example, a tool spindle.

The machine tool 10 comprises multiple axes and/or N axes, for example 5 axes. For illustration purposes, for example, the workpiece table 12 defines two rotary axes A, C, and the machining unit 16 defines three linear axes X, Y, Z. However, other configurations are possible.

The machine tool 10 further comprises a control unit 20 that may issue control commands to the N different machine axes. The machine tool 10 is in particular a CNC machine, and accordingly the control commands may be NC commands.

Furthermore, a CAM system 22 is provided. In many embodiments, such system is not part of the machine tool 10 but may operate independently of the machine. Using the CAM system 22, a machining path may be generated on the basis of CAD data of the workpiece 14 or its target geometry, from which control commands for the machine tool 10 may be generated during post-processing in a generally known manner.

Figure 2:
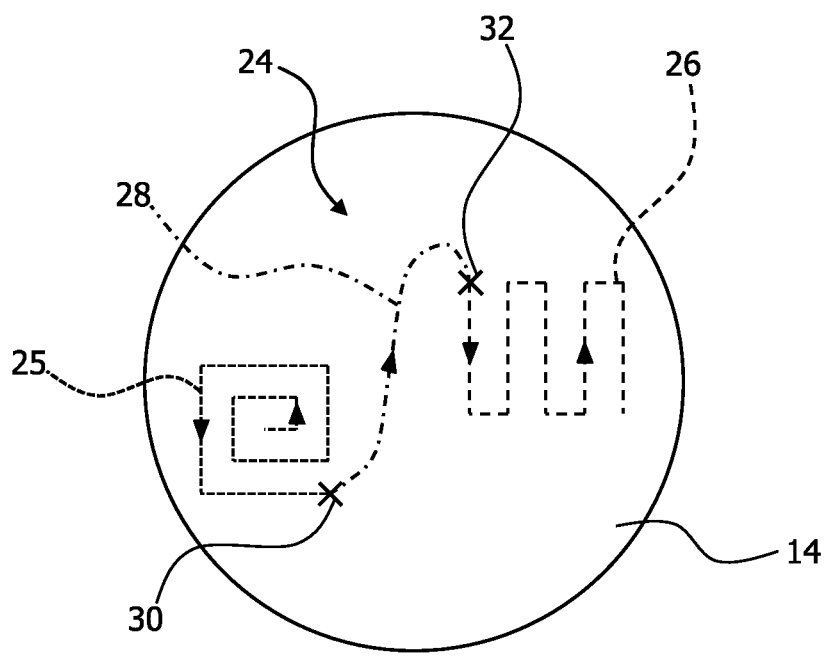
FIG. 2 is a schematic representation of a machining path.

An exemplary machining path 24 is shown in FIG. 2. The representation is for illustrative purposes only and is neither necessarily to scale nor complete. To machine the workpiece 14, the tool 18 may be moved relative to the workpiece 14 in accordance with the machining path 24. The machining path 24 includes a first engagement path segment 25 and a second engagement path segment 26, along each of which the tool 18 engages with the workpiece 14 at least in sections. The engagement path segments 25, 26 may serve, for example, to machine different geometric features of the workpiece 14, for which different machining strategies may be employed. The first engagement path segment 25 has an end point 30. The second engagement path segment 26 has a starting point 32. Evidently, the end point 30 and the starting point 32 do not coincide. Therefore, during machining, the tool 18 must be moved relative to the workpiece 14 along the first engagement path segment 26 after machining and along the second engagement path segment 28 before machining in order to move from the end point 30 to the starting point 32. For this purpose, the machining path 24 includes a connecting path segment 28 that continuously connects the end point 30 and the starting point 32. Along the connecting path segment 28, the tool 18 does not engage with the workpiece 14. It is understood that the illustration in FIG. 2 is purely schematic. In particular, the machining path 24 and/or the connecting path segment 28 and/or the first engagement path segment 25 and/or the second engagement path segment 26 may have a three-dimensional path. In general, the machining path 24 may be a three-dimensionally extended curve.

The connecting path segment 28 defines a collision-free movement. In other words, the connecting path segment 28 is selected such that when the tool 18 moves along the connecting path segment 28, neither the tool 18 nor any other part of the machine tool 10, such as the machining unit 16, collides with the workpiece 14.

Figure 3:
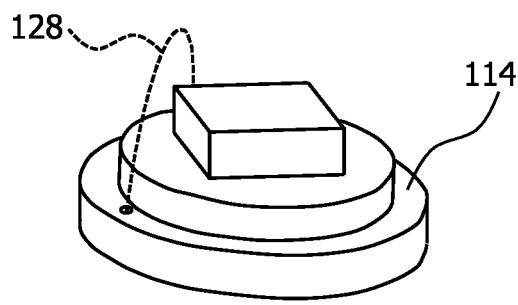
FIG. 3 is a schematic perspective representation of a first connecting path segment.
Figure 4A:
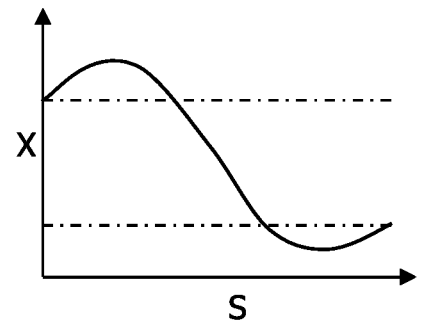
FIG. 4a-e are schematic representations of movements in five machine axes along the first connecting path segment.
Figure 4B:
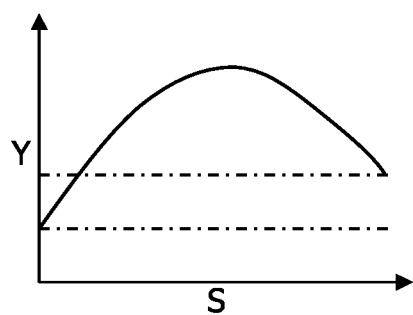
Figure 4C:
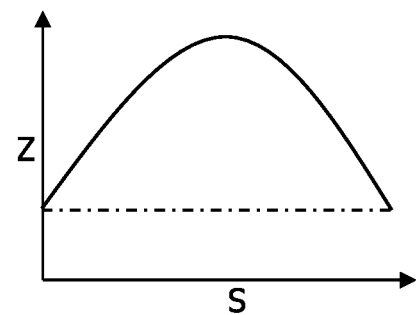
Figure 4D:
Figure 4E:
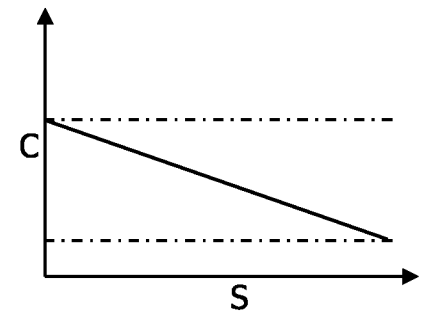

FIG. 3 shows a first connecting path segment 128 that avoids a collision with a workpiece 114. As explained above, the connecting path segment 128 connects two engagement path segments not illustrated. The first connecting path segment 128 is determined according to a conventional method aimed at having a machining path that includes curvature-continuous and tangent-continuous transitions between engagement path segments and connecting segments. In other words, the aim is to have a soft machining path, for example in the form of a spline. As can be seen in FIG. 3, the connecting path segment 128 describes a sweeping arc that passes around the workpiece 114 in a collision-avoiding manner.

According to conventional methods, a connecting path segment such as the first connecting path segment 128 is determined by calculating and interpolating on the tool path plane, i.e. relative to the workpiece. In this process, the respective paths of the engagement path segments to be connected are taken into account, for example by using the slope and curvature at the end point and/or starting point as boundary conditions. Subsequently, it is determined how the machining path is to be implemented in the various machine axes X, Y, Z, A, C through suitable feed. For the first connecting path segment, the movement paths shown in FIG. 4a-e in the machine axes X, Y, Z, C, A result from post-processing, for example. For other geometries and/or movements, further and/or other axes may be involved in generating the movement correspondingly. FIG. 4a-e are to be understood in this connection purely illustratively. S designates a current process progress and/or a program line. As can be seen, a movement reversal takes place in each of the three machine axes X, Y, Z when moving along the first connecting path segment 128. The dashed lines mark the net movement in the respective machine axis X, Y, Z between a starting point and an end point of the connecting path segment 128, which in the illustrated case, for example, carries a negative sign for the X axis, carries a positive sign for the Y axis, and is zero for the Z axis. The movement in the C axis is linear, in the example shown, no movement takes place in the X axis.

Figure 5:
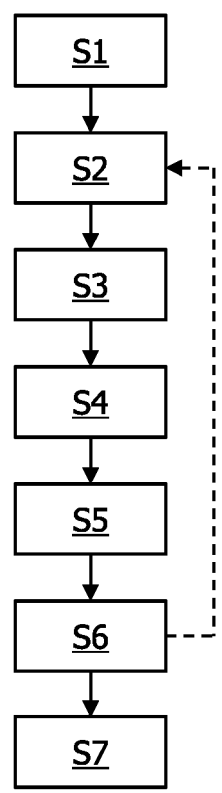
FIG. 5 is a schematic flow diagram of a method for determining a machining path.
Figure 6:
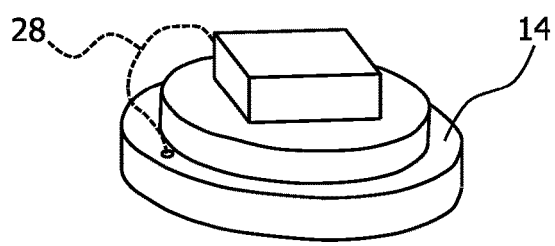
FIG. 6 is a schematic perspective representation of a second connecting path segment of a second machining path.

In contrast, a method according to the invention is described below. A schematic flow chart of this method is shown in FIG. 5. FIG. 6 illustrates a connecting path segment 28 which is calculated in the method. This connecting path segment 28 also avoids collisions with the workpiece 14. FIGS. 7a-e show exemplary movements in the machine axes X, Y, Z, A, C resulting from the connecting path segment 28. As described above, the connecting path segment 28 is part of a machining path and connects engagement path segments not illustrated in FIG. 6 (cf. FIG. 2).

In step S1, an interpolation group of machine axes is defined. This definition may be based on a user specification and/or be automated. The CAM system 22 may have a user interface for querying the user specification. In the case shown, the interpolation group comprises, for example, all axes except for the Z axis.

The purpose of the interpolation group is explained in more detail below. In general, it is intended to generate a movement that is simple and robust and protects the machine in the respective machine axis for the machine axes of the interpolation group. The remaining machine axis or, in some embodiments, the multiple remaining machine axes serves/serve as a retraction axis through which collision avoidance can be significantly implemented. In the exemplary case, the Z axis serves as the retraction axis. For this axis, it is accepted that considerable movement reversal must take place for reasons of collision avoidance (see FIG. 7c). For the other axes, on the other hand, reversal movements can be largely or completely dispensed with, as explained below.

In step S2, an interpolation starting point 34, 36, 37, 41 is determined for each of the machine axes of the interpolation group. These interpolation starting points 34, 36, 37, 41 result from the end point 30 of the first engagement path segment 25 (cf. FIG. 2) as the coordinates of the end point 30 with respect to the respective machine axes X, Y, A, C.

In step S3, an interpolation end point 38, 40, 41, 43 is determined for each of the machine axes of the interpolation group. These interpolation end points 38, 40, 41, 43 result from the starting point 32 of the second connecting path segment 26 (cf. FIG. 2) as the coordinates of the starting point 32 with respect to the respective machine axes X, Y, A, C.

In step S4, a link function 42, 44, 45, 47 is determined between the respective interpolation starting point 34, 36, 37, 39 and the respective interpolation end point 38, 40, 41, 43 by interpolation with respect to each machine axis (in the example, X, Y, A and C). For axis A, there is no movement in the machine axis in the present example. However, this may be different depending on the workpiece geometry, tool type, connecting path segment, etc. The description for four machine axes X, Y, Z, C, in which movement takes place along the connecting path segment 28, is only for illustration purposes.

The link functions 42, 44, 45, 47 are preferably selected such that reversal movements in the respective machine axis X, Y, A, C are largely avoided during movement along the connecting path segment 28. Evidently, the movements in the machine axes X, Y, A, C shown in FIGS. 7a, 7b, 7d and 7e are comparatively easy on the machine and efficient because in the respective machine axis X, Y, A, C, it is not necessary to brake, reverse, accelerate, brake again and accelerate again along the connecting path segment 28.

The link functions 42, 44, 45, 47 are S-bend-shaped and/or stepped in the present example. The link functions 42, 44, 45, 47 may be symmetrical with respect to a center on the S axis (process progress or program line). Depending on the collision situation, however, it may also be favorable to initially execute no movement or only a slight movement in the relevant machine axis or to provide the majority of the movement to be completed or the entire movement to be completed already at the beginning. In this respect, the interpolation of the link functions 42, 44, 45, 47 includes a collision check as well as an associated optimization which may be carried out iteratively until the movements in the machine axes X, Y, Z, A, C are reasonably coordinated with each other in such a way that a collision can be avoided without excessive retraction movements in the retraction axis.

Figure 8:
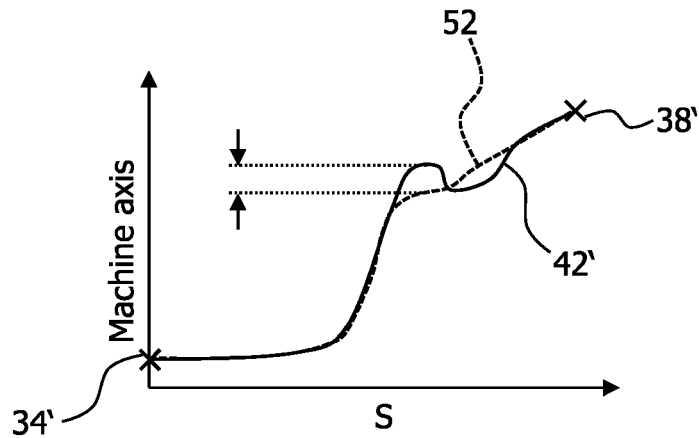
FIG. 8 is a schematic diagram illustrating a movement in a machine axis.

In some embodiments, the link functions 42, 44, 45, 47 are monotonic or at least substantially monotonic functions. Referring to FIG. 8, a link function 42' may in particular be an at least substantially monotonic function in that, for a reference function 52 which is a monotonic function connecting an interpolation starting point 34' and an interpolation end point 38' and for which a maximum deviation (indicated by the short arrows and the dotted lines) from the link function 42' is minimal, the maximum deviation between the link function 42' and the reference function 52 is less than 20%, preferably less than 10% and particularly preferably less than 5% of a distance between the interpolation starting point 34' and the interpolation end point 38' with respect to the corresponding machine axis X, Y, Z, A, C.

Figure 9A:
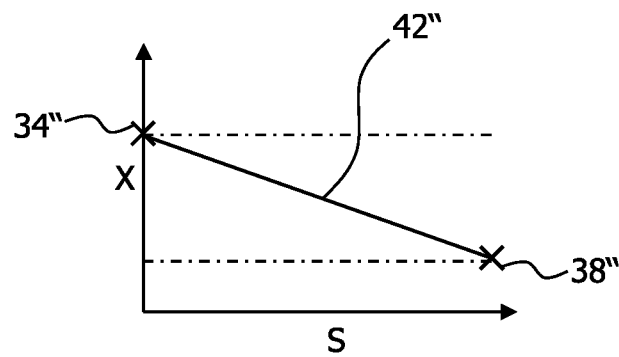
FIG. 9a-b are schematic representations of movements in two machine axes for linear link functions.
Figure 9B:
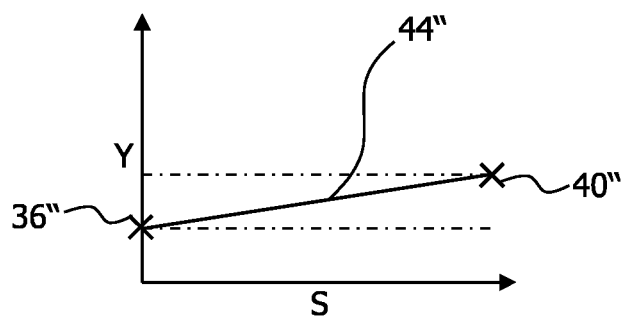

FIGS. 9*a* and 9*b* show alternative link functions 42", 44" which are exemplary only for the X and Y axes. They are based on linear interpolation. Interpolation in the machine axes of the interpolation group is thus particularly simple.

In further embodiments, several linearly interpolated subsections may be combined to form a link function. This may, for example, create a stepped path of the relevant link function, for example if this is useful for collision avoidance.

In some embodiments, linear interpolation may first be performed for all machine axes and a collision check performed. If no collision occurs, the connecting path segment may simply be defined by linear movements in the machine axes. If, on the other hand, a collision occurs, non-linear link functions may be calculated on a test basis. Alternatively or additionally, linear interpolation may be replaced by a retraction function for the retraction axis and another collision check may be performed. In the case described above, a collision cannot be reasonably avoided without a retraction axis.

Figure 7A:
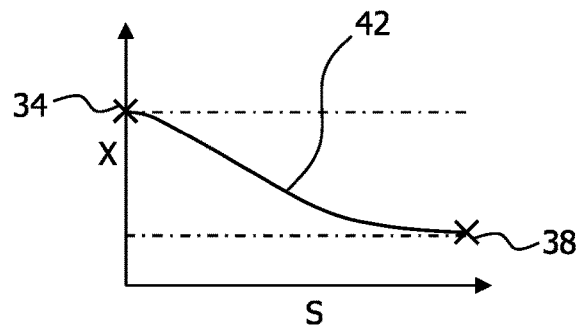
FIG. 7a-e are schematic representations of movements in five machine axes along the second connecting path segment.
Figure 7B:
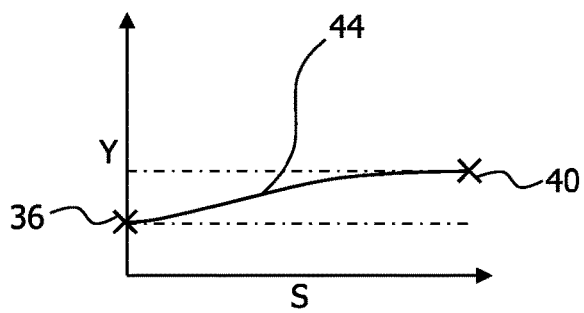
Figure 7C:
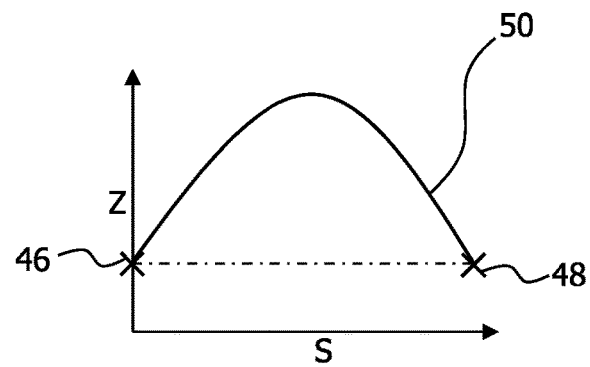
Figure 7D:
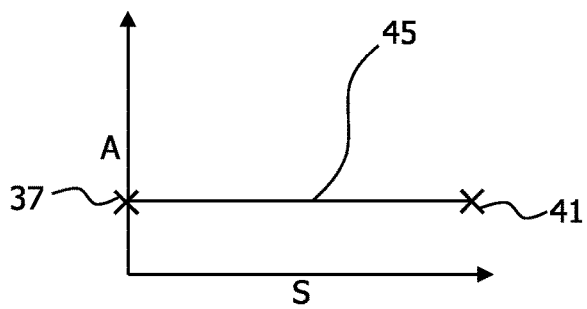
Figure 7E:
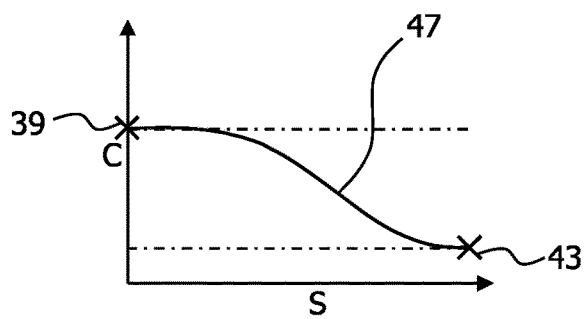

In step S5, collision-avoiding non-monotonic interpolation is performed for the retraction axis as mentioned. This is illustrated in FIG. 7*c*. In the Z axis acting as the retraction axis, retraction is generated between a retraction starting point 46 and a retraction end point 48 in the example. They are defined by the end point 30 and the starting point 32 of the engagement path segments 25, 26. For example, a parabola, an arc or even a string of several linear sections or a spline or any curve with the necessary properties is selected as the retraction function 50, whereby the tool 18 is first moved back and then moved forward again during movement along the engagement path segment 28. Generally, it may be provided that the retraction function 50 is a continuous, preferably tangent-continuous and particularly preferably curvature-continuous function with a single extremum.

A linear axis or a rotary axis may act as the retraction axis. The use of the Z axis as retraction axis is an example only. As explained, it may result from the choice of the interpolation group as the remaining axis. If several machine axes are not included in the interpolation group, one of them may be selected as retraction axis.

In some embodiments, the retraction axis is the machine axis X, Y, Z, A, C of the machine tool 10 that has the highest acceleration capability and/or the highest maximum speed. As can be seen from FIGS. 7*a-c*, the most extensive movement often occurs in the retraction axis, even if the machine axis coordinates of retraction starting point 46 and retraction end point 48 are identical. It may then be time-efficient and/or easy on the machine to use a fast and/or responsive machine axis as the retraction axis.

Referring again to FIG. 5, in step S6, the connecting path segment 28 is determined in accordance with the determined link functions 42, 44 and in particular in accordance with the retraction function 50. Consequently, other than with the first connecting path segment 128 described above, from which the axis movements are calculated, the connecting path segment 28 results from the movements in the machine axes X, Y, Z, A, C by corresponding calculation. A link between the engagement path segments 25, 26 is thus calculated in the machine axes X, Y, Z, A, C.

In step S7, the machining path 24 is defined. It is understood that the machining path 24 may include several engagement path segments 25, 26 and several connection path segments 28. The method is then carried out as described for several connecting path segments 28.

In some embodiments, the method may comprise an iterative determination of the connecting path segment 28, which is illustrated by the dashed arrow in FIG. 5. A collision check is performed for different iterations based on a different interpolation group in each case. For example, the Z axis is first used as the retraction axis. In a next iteration, the X axis is used as the retraction axis, etc., whereby any sequence may be provided. A decision for a certain interpolation group or a certain connecting path segment resulting from the iterations may then be made, for example, on the basis of a shortest time required, a smallest amount of energy required, a shortest length of the connecting path segment, etc. The interpolation group may then be selected by the user. Furthermore, it may also be provided that different possible connecting path segments are displayed to the user who selects the preferred one.

Interpolation in the machine axes may result in the machining path 24 being tangent-discontinuous and/or curvature-discontinuous in the connecting path segment 28 and/or at transitions between the connecting path segment 28 and at least one of the engagement path segments 25, 26. In this respect, the invention places greater emphasis on the design of the functions describing the movement in the individual machine axes.

The CAM system shown in FIG. 1 includes a computer program product 54 that includes a storage medium on which one or more computer-executable program code portions or instruction code for performing the described method is stored. The computer program product 54 may also be configured independently of a CAM system and include, for example, a portable storage medium or storage space on a server. The one or more computer-executable program code portions or instruction code comprises program code arranged to implement the method steps disclosed herein.

Figure 10:
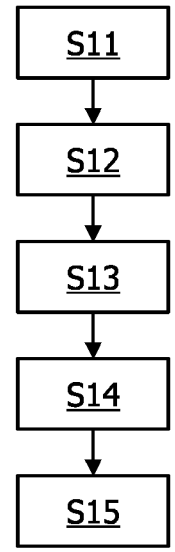
FIG. 10 is a schematic flow diagram of a method for machining a workpiece.

With reference to FIG. 10, a method for machining the workpiece 14 is described below. It is based on the use of the machining path 24 as defined as follows.

In step S11, the machining path 24 is generated. Accordingly, step S1*l* may comprise the method described with reference to FIG. 5.

In step S12, post-processing is performed as needed to generate control commands from the machining path 24 to control the machine tool 10.

In step S13, the workpiece 14 is machined by moving the tool 18 along the first engagement path segment 25.

In step S14, the tool is moved along the connecting path segment 28. For this purpose, movements are generated in the machine axes X, Y, Z, A, C in such a way that in one of the machine axes (in the above example: Z) a backward movement and a subsequent forward movement of the tool 18 take place and that in each of the other machine axes (in the above example: X, Y, A, C) a movement is generated whose direction of movement is maintained or reversed temporarily to an at most insignificant extent when moving along the connecting path segment 28.

In step S15, the workpiece 14 is machined by moving the tool 18 along the second engagement path segment 26.

It is understood that any reference to retraction or retracting in the context of the present disclosure generally includes any backward movement. In the case of a rotary axis, this may also be turning back.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions or executable portions embodied therein.

It will also be understood that one or more computer-executable program code portions or instruction code for carrying out or performing the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for determining a machining path for material-removing machining of a workpiece using a multi-axis machine tool, wherein control commands for controlling a number of N different machine axes of a machine tool can be generated from the machining path, according to which a tool can be moved continuously along the machining path, wherein the machining path comprises a first engagement path segment and a second engagement path segment along which the tool engages with the workpiece at least in sections, and wherein the machining path further comprises a connecting path segment along which the tool does not engage with the workpiece and which connects an end point of the first engagement path segment to a starting point of the second engagement path segment continuously and collision-free with the workpiece;

the method comprising:

defining an interpolation group of machine axes comprising at least one and no more than N−1 of the N machine axes;

determining, for the machine axes of the interpolation group, a respective interpolation starting point defined by the end point of the first engagement path segment relative to the respective machine axis;

determining, for the machine axes of the interpolation group, a respective interpolation end point defined by the starting point of the second engagement path segment relative to the respective machine axis;

determining, for the machine axes of the interpolation group, a respective link function between the respective interpolation starting point and the respective interpolation end point by interpolation with respect to the respective machine axis;

defining the connecting path segment in accordance with the determined link functions;

defining the machining path using the determined connecting path segment; and material-removing machining a workpiece along the defined machining path using a multi-axis machining machine.

2. The method of claim 1, wherein interpolating is performed such that the link function for each of the machine axes of the interpolation group is an at least substantially monotonic function.

3. The method of claim 1, wherein for at least one of the machine axes which does not belong to the interpolation group, collision-avoiding non-monotonic interpolation is carried out between the end point of the first engagement path segment and the starting point of the second engagement path segment.

4. The method of claim 1, further comprising:
determining one of the N machine axes not belonging to the interpolation group as the retraction machine axis;
determining, for the retraction machine axis, a retraction starting point defined by the end point of the first engagement path segment relative to the retraction axis;
determining, for the retraction machine axis, a retraction end point defined by the starting point of the second engagement path segment relative to the retraction machine axis; and
determining, for the retraction machine axis, a retraction function that extends between the retraction starting point and the retraction end point taking into account a geometry of the workpiece such that, when moving along the connecting path, the tool is first moved back with respect to the retraction machine axis and subsequently moved forward again in a way that, in combination with the one or more link functions determined for the interpolation group, a collision with the workpiece is avoided.

5. The method of claim 4, wherein the retraction function is determined from the group consisting of a continuous, tangent-continuous and curvature-continuous function with a single extremum.

6. The method of claim 4, wherein the retraction axis is selected from the group consisting of a linear axis and a rotary axis.

7. The method of claim 4, wherein at least one selected from the group consisting of (i) the retraction axis is a machine axis of the machine tool selected from the group consisting of a highest acceleration capability and a highest maximum speed and (ii) determining the retraction machine axis is based on a user specification.

8. The method of claim 1, wherein determining the interpolation group is based on a user specification.

9. The method of claim 1, wherein the link function is an at least substantially monotonic function in that, for a reference function which is a monotonic function connecting the respective interpolation starting point to the respective interpolation end point and for which a maximum deviation from the link function is minimal, the maximum deviation between the link function and the reference function is smaller than 20% of a distance between the interpolation starting point and the interpolation end point with respect to the respective machine axis.

10. The method of claim 1, wherein the connecting path segment is determined iteratively by performing a collision check for different iterations based on a respective other interpolation group in each case.

11. The method of claim 1, wherein the respective link function is determined at least in sections by linear interpolation.

12. The method of claim 1, wherein the respective link function is selected from the group consisting of stepped and S-bend-shaped.

13. The method of claim 1, wherein the interpolation group comprises exactly N−1 of the N machine axes.

14. The method of claim 1, wherein N is at least 5.

15. The method of claim 1, wherein the machining path selected from the group consisting of (i) in the connecting path segment and (ii) at transitions between the connecting path segment and at least one of the engagement path segments, is selected from the group consisting of tangent-discontinuous and curvature-discontinuous.

16. A computer program product for determining a machining path for a material-removing machining of a workpiece using a multi-axis machining machine, wherein control commands for controlling a number of N different machine axes of a machining machine can be generated from the machining path, according to which a tool can be moved continuously along the machining path, wherein the machining path comprises a first engagement path segment and a second engagement path segment along which the tool engages with the workpiece at least in sections, and wherein the machining path further comprises a connecting path segment which connects an end point of the first engagement path segment to a starting point of the second engagement path segment continuously and collision-free with the workpiece;

wherein the computer program product comprising at least one non-transitory computer readable medium having computer-readable program code portions embodied therein, the computer-readable program code portions comprising executable portions for:

defining an interpolation group of machine axes comprising at least one and no more than N−1 of the N machine axes;

determining, for the machine axes of the interpolation group, a respective interpolation starting point defined by the end point of the first engagement path segment with respect to the respective machine axis;

determining, for the machine axes of the interpolation group, a respective interpolation end point defined by the starting point of the second engagement path segment relative to the respective machine axis;

determining, for the machine axes of the interpolation group, a respective link function between the respective interpolation starting point and the respective interpolation end point by interpolation with respect to the respective machine axis;

defining the connecting path segment in accordance with the determined link functions;

defining the machining path using the determined connecting path segment; and material-removing machining a workpiece along the defined machining path using a multi-axis machining machine.

17. A method for machining a workpiece using a multi-axis machine tool which comprises different machine axes and which is adapted to machine a workpiece using a tool by moving the tool along a machining path, wherein the machining path comprises a first engagement path segment and a second engagement path segment along which the tool engages with the workpiece at least in sections, and wherein the machining path further comprises a connecting path segment along which the tool does not engage with the workpiece and which connects an end point of the first engagement path segment to a starting point of the second engagement path segment continuously and collision-free with the workpiece;

the method comprising:
- defining an interpolation group of machine axes comprising at least one and no more than N−1 of the N machine axes;
- determining, for the machine axes of the interpolation group, a respective interpolation starting point defined by the end point of the first engagement path segment relative to the respective machine axis;
- determining, for the machine axes of the interpolation group, a respective interpolation end point defined by the starting point of the second engagement path segment relative to the respective machine axis;
- determining, for the machine axes of the interpolation group, a respective link function between the respective interpolation starting point and the respective interpolation end point by interpolation with respect to the respective machine axis;
- defining the connecting path segment in accordance with the determined link functions; and
- defining the machining path using the determined connecting path segment; and
- machining the workpiece by moving the tool along the first engagement path segment;
- moving the tool along the connecting path segment by generating movements in the machine axes, wherein the movements in the machine axes are generated such that a backward movement and a subsequent forward movement of the tool take place in one of the machine axes and a movement is generated in each of the other machine axes, the direction of movement of which is maintained or reversed temporarily when moving along the connecting path segment; and
- machining the workpiece by moving the tool along the second engagement path segment.

18. The method of claim 17, wherein the machine tool has at least five machine axes and wherein a movement is generated in at least four machine axes whose movement is maintained or reversed when moving along the connecting path segment.

19. The method of claim 17, wherein the machining path selected from the group consisting of (i) in the connecting path segment and (ii) at transitions between the connecting path segment and at least one of the engagement path segments, is selected from the group consisting of tangent-discontinuous and curvature-discontinuous.

* * * * *